April 8, 1969   R. K. DAUGHERTY   3,437,116
APPARATUS FOR PEELING VEGETABLES OR FRUITS
Filed Sept. 12, 1966   Sheet 1 of 3
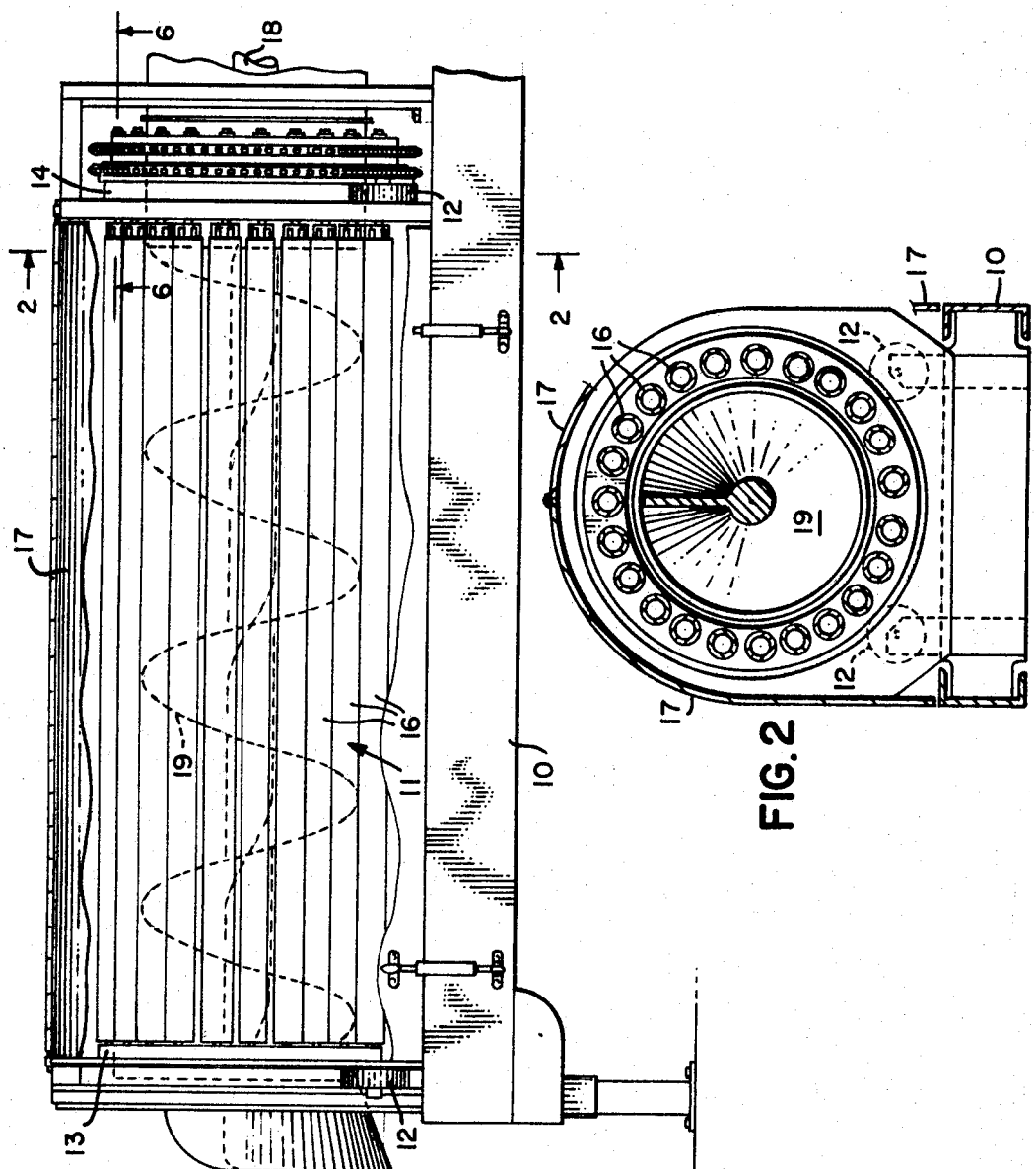
INVENTOR.
RALPH K. DAUGHERTY
BY Allen and Kenny
ATTORNEYS

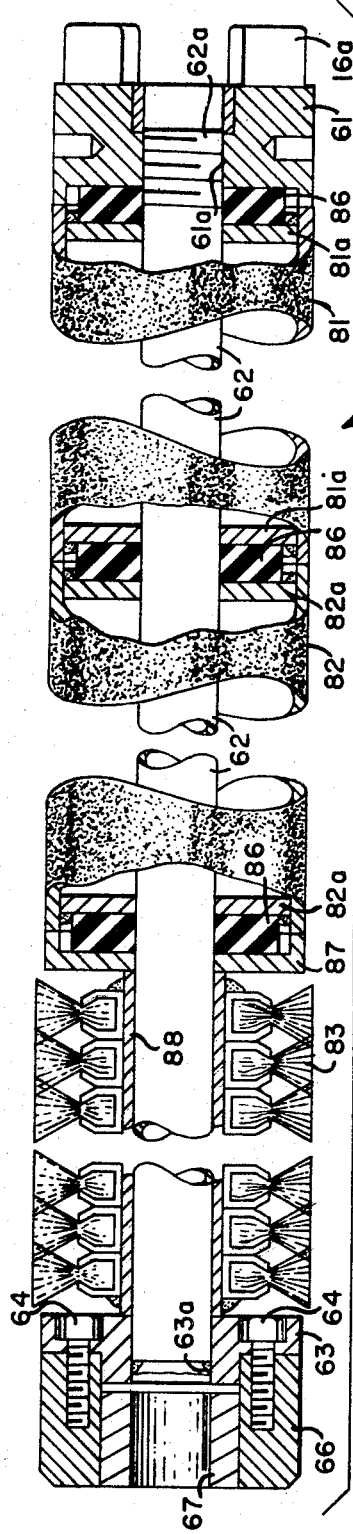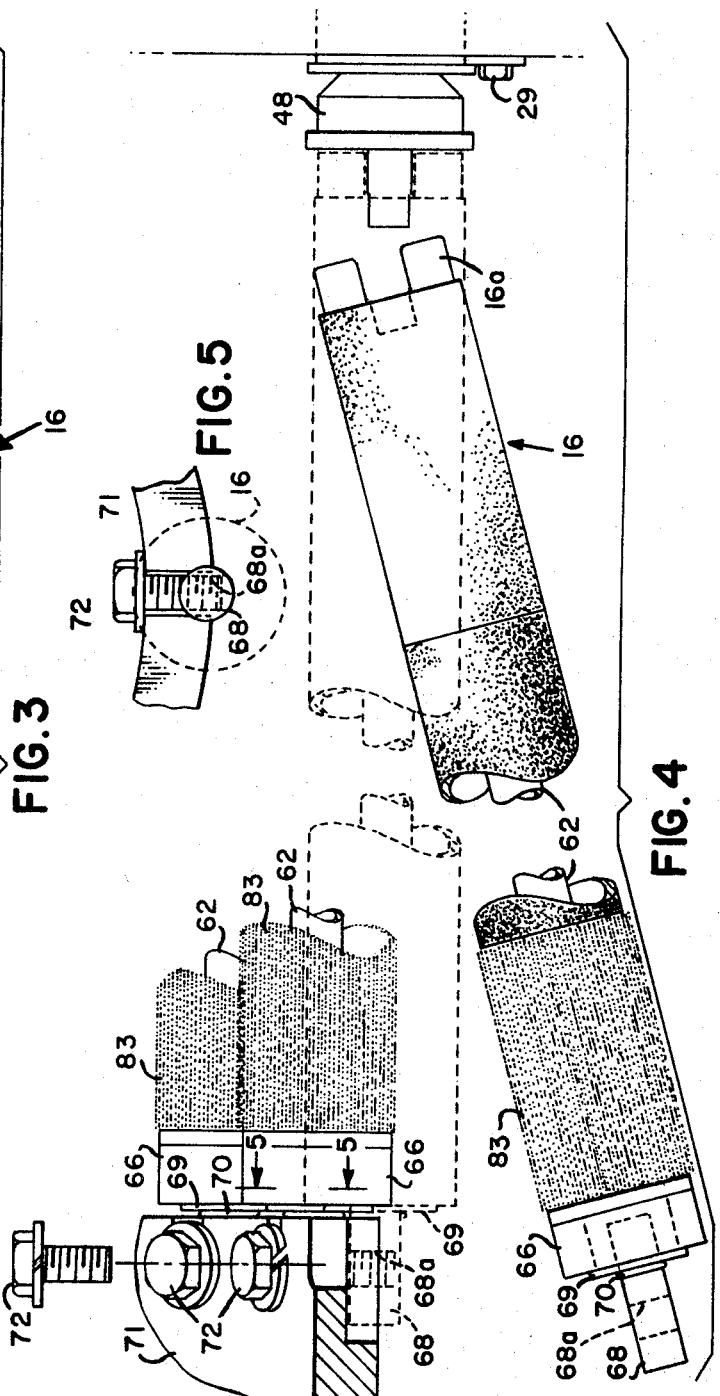

INVENTOR.
RALPH K. DAUGHERTY
BY
ATTORNEYS

United States Patent Office 3,437,116
Patented Apr. 8, 1969

3,437,116
APPARATUS FOR PEELING VEGETABLES OR FRUITS
Ralph K. Daugherty, San Jose, Calif., assignor of one-half to Genevieve I. Hanscom, Saratoga, Calif., and one-half to Genevieve I. Hanscom, Robert Magnuson, and Lois J. Duggan, trustees of the estate of Roy M. Magnuson, deceased
Filed Sept. 12, 1966, Ser. No. 578,747
Int. Cl. A47j 17/14
U.S. Cl. 146—49                4 Claims

ABSTRACT OF THE DISCLOSURE

An abrasive peeling machine which provides a rotatable cylinder having its peripheral wall formed of a plurality of parallel horizontally disposed peeling rolls through which material such as potatoes is conveyed for peeling action. For each roll there is provided a removable cartridge drive unit at one end interposed between the driving means and the roll and having a detachable mounting in the drive ring of the cylinder, which ring carries one end of the peripheral series of peeling rolls.

---

The present invention relates to apparatus for peeling vegetables or fruits by abrasive methods and is concerned more particularly with improvements in such apparatus which will promote easy servicing and long life of the equipment and also adaptability of the equipment to various fruits or vegetables.

This apparatus is of the general character disclosed in the patent to Dorsa et al. 3,134,413 issued May 26, 1964.

It is an object of the present invention to provide an abrasive vegetable peeler wherein the drive for each abrasive peeling roll embodies a removable cartridge-type drive unit of sealed construction which facilitates easy repair and service of the equipment.

A further object of the invention is to provide an improved peeling apparatus wherein the peeling rolls are advantageously mounted for assembly and disassembly individually without the removal of any other major parts of the machine.

A further object of the invention is to provide a peeling roll assembly for a peeling apparatus wherein the roll is of segmental construction and can provide different treating surfaces at different portions along the length of the roll to adapt the equipment to different peeling conditions insofar as the character of the vegetable or fruit being peeled and the particular variety of vegetable or fruit being peeled.

Other objects and advantages of the invention will be apparent from the following description of a preferred embodiment thereof, taken in connection with the accompanying drawings, in which:

FIG. 1 is a fragmentary side elevational view of the peeling apparatus embodying the invention;

FIG. 2 is a transverse sectional view taken in a plane indicated in the line 2—2 in FIG. 1;

FIG. 3 is a sectional elevational view of the sectional roll assembly partially broken away to illustrate details of construction;

FIG. 4 is a fragmentary perspective view illustrating the roll mounting and its method of removal for replacement or repair;

FIG. 5 is a detail view of the roll mount at one end thereof taken as indicated by the line 5—5 in FI. 4;

Figure 6:
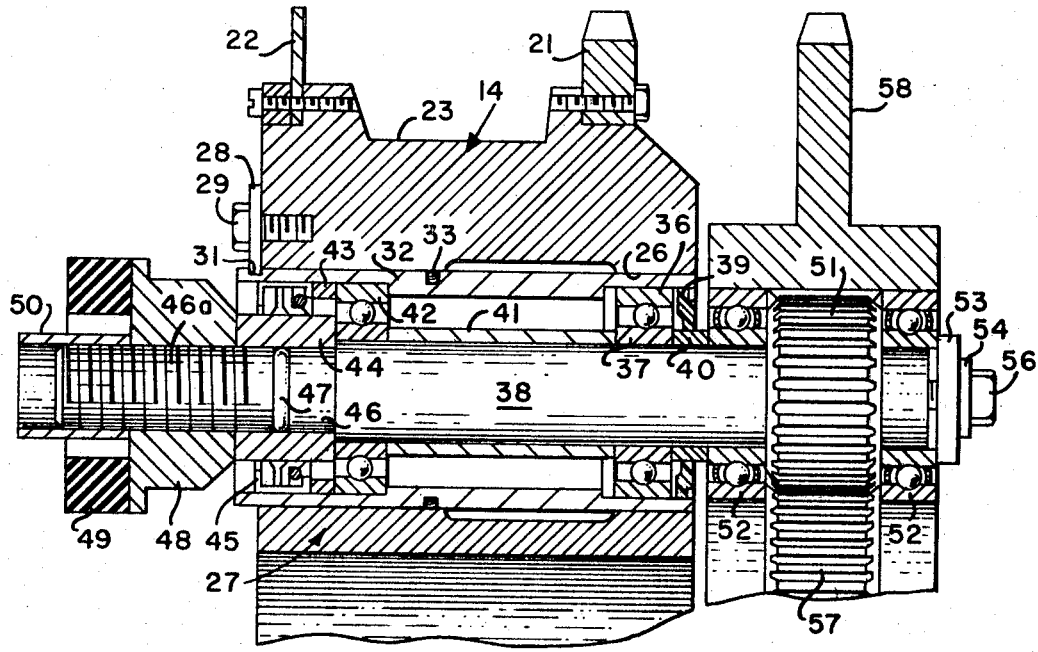
FIG. 6 is a sectional view of the cartridge drive unit for each of the rolls, the plane of the view being indicated by the line 6—6 in FIG. 1.

Referring first to FIGS. 1 and 2 the peeling apparatus of the instant invention includes a frame 10 upon which a rotary drum 11 is mounted for rotation by means of a plurality of trunnion rollers 12 engaging respective end rings 13 and 14 of the drum 11 which have horizontally extending rolls 16 journaled therein as will be described in detail later to form the periphery of the drum or cylinder. Suitable tie bars (not shown) extend between the end rings 13 and 14. A suitable cover 17 is provided for the apparatus. The drum and the individual peeling rolls 16 are driven in a suitable fashion by means including the ring gear 58 as described in detail in said Patent No. 3,134,413.

A screw conveyor 19 is carried by the shaft 18 and serves to progress fruit along through the abrasive cylinder formed by the peeling rolls 16 from right to left as viewed in FIG. 1.

Referring to FIG. 6, the ring 14 at the feed end of the peeling cylinder carries a large gear 21 by means of which the entire ring, including the rolls 16, are rotated about the axis of the shaft 18, and also carries a sealing ring 22 to protect the trunnion groove 23 from receiving debris from within the peeling area. This ring member 14 has a series of peripherally arranged axially extending apertures 26, in each of which a cartridge drive unit 27 is mounted by means of a close sliding fit and by a square retainer 28 and a retaining screw 29 which engage in a recess 31 in the outer cylindrical housing member 32 of the cartridge drive unit. An O-ring 33 is seated in a suitable annular groove in the cylindrical housing 32 to provide a seal around the cartridge assembly with respect to the ring 14.

The cylindrical housing member 32 (FIG. 6) is provided with a bored seat 36 adjacent its right hand end in which an open-type ball bearing 37 is seated to journal a drive shaft 38 of the cartridge drive unit. A suitable seal 39 is mounted in the end of the bored recess 36 on a sleeve spacer 40 to retain lubricant within the cylinder housing 32. The bearing 37 at its inner race is engaged by a cylindrical spacer 41 which closely engages about the shaft 38 and at its other end seats against a second open-type bearing 42 for the shaft 38 within the housing cylinder 32. This bearing 42 is engaged by a spacer ring 43 adjacent its outer race, and by a spacer ring 44 adjacent its inner race. This spacer ring 44 seats about reduced end portion 46 of the shaft 38 in which an O-ring or seal 47 is mounted in a suitable O-ring groove and engaging the inner surface of the spacer 44. The shaft extension 46 is threaded at 46a and is engaged by a threaded coupling member 48 of a flexible drive coupling of a conventional type. The coupling member 48 (FIGS. 6, 7 and 8) has three teeth 48a engaged by a six-tooth flexible or resilient drive member 49 having a plurality of recesses to engage the three teeth 48a, and also to engage the corresponding series of three teeth 16a of the roll assembly to be described later.

The threaded end 46a (FIG. 6) carries a sleeve 50 having a slip fit thereon and forming a guide and bearing member within the associated roller assembly as will be later described. At its opposite end i.e., the right end in FIG. 4, the shaft 38 carries a drive pinion 51 which is positioned between two sealed and lubricated bearings 52 on the shaft 38 and secured thereon by means of a washer 53, a lockwasher 54 and a capscrew 56 threaded into the end of the shaft 38. The outer race of left hand bearing 52 abuts the spacer sleeve 40. The pinion 51 of each cartridge drive assembly meshes with an internal gear 57 formed within a large drive gear 58 which is suitably driven in time from the drive means of a machine as described in said patent to effect a desired rotation of the individual peeling rollers associated with the cartridge drive unit.

Figure 7:
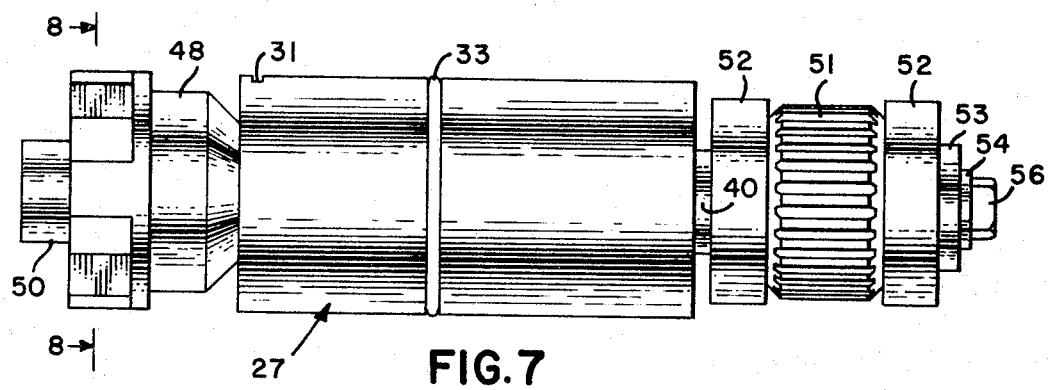
FIG. 7 is an elevational view of the cartridge drive unit for one of the rolls.
Figure 8:
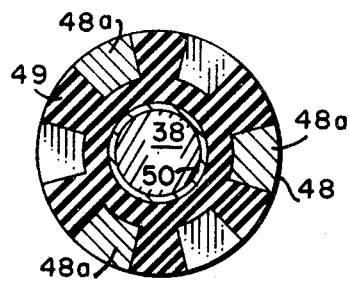
FIG. 8 is a sectional view taken as indicated by the line 8—8 and illustrating the flexible coupling employed between each cartridge drive unit and the associated roll.

It will be apparent that the drive unit itself as seen in elevation in FIG. 7 can be removed easily from the machine after removal of the associated roll assembly as described herein by the removal of the capscrew 56 and the washer 53 and the right hand bearing 52. The drive unit can be removed with the left hand bearing 52 and the pinion 51 thereon. The space within the housing cylinder 32 is packed with a suitable lubricant, which is protected from the water and debris within the peeling apparatus by the seal 45. The provision of the cartridge drive unit as a drive for each individual roll enables carrying a replacement stock of these cartridge drive units at each individual plant employing the peeling apparatus for replacement of any particular drive unit which requires servicing for any reason. This also enables shipment of this removed drive unit back to a factory for factory servicing before it is returned to a user.

Each roll 16 (FIG. 3), as previously described, comprises a right hand end fitting or coupling member 61 which is internally threaded at 61a to engage a threaded portion 62a of an internal support shaft 62 for each roll 16. At its left hand end the shaft 62 is secured to an end coupling member 63 as by welding, as indicated at 63a, and this end coupling member has a plurality of recessed seats formed therein to receive cap screws 64 by means of which it is secured to an end collar 66. A sleeve bearing 67 is seated within the end collar 66 and is adapted to receive a support shaft 68 having a thrust collar 69 and a snap ring 70 thereon forming a stop. The shaft 68 has a transverse threaded bore 68a by means of which it may be secured to a support flange 71 on the end ring 13 by means of a cap screw 72 and a suitable lockwasher.

The abrasive roll or the cleaning roll, as the case may be, is shown with one character of surface in FIG. 4 wherein the abrasive surface extends entirely between the respective end coupling members or carrying members 61 and 63 of the rolls. Preferably the roll is constructed so that the frame of the roll comprising the coupling member 61 and 63 and the shaft 62 can be employed to mount sectional rolls of various characters as a part of a particular abrasive peeling roll. As shown in FIG. 3, for example, the roll assembly may include a right hand abrasive cylinder or roll segment 81 having one size of grit thereon, a second abrasive cylinder or roll segment 82 having another size of abrasive grit thereon and a brush assembly 83 for subsequent cleaning operations.

As seen in FIG. 3, the right hand end coupling 61 has abutting thereto a resilient washer 86 which is interposed between the end coupling 61 and the end wall 81a of the roll segment 81. At the left hand end of the roll segment 81 a similar end wall 81a is provided engaging a similar resilient washer 86 seated between the left end wall 81a and the right end wall 82a of the next adjacent cylinder 82. Similarly, at the left hand end of the abrasive roll segment 82 a resilient washer 86 is provided which is seated between the left hand end wall 82a of this roll and a cup-shaped spacer 87 which seats freely on the shaft 62. The spacer 87 is abutted by a sleeve or carrier 88 for the brushes of the brush-type roll segment. The sleeve 88 abuts the coupling member 63 at the left hand end of the assembly. The resilient washers or rubber compression rings 86 serve to seal the roll segments against the entry of water therein.

It will be seen that this sectional construction of the roll, as illustrated in FIG. 3, will enable the selective mounting of the desired roll segment for treating the surface of the vegetable or fruit being peeled. For example, all three of the segments could be abrasive members with different abrasive characteristics, or one abrasive member could be employed and two brush members. If desired for cleaning with certain types of fruit and vegetables in a second operation, the entire roll could be made up of brushes.

While I have shown and described a preferred form of the invention, it will be apparent that the invention can be varied and modified from the form shown so that the scope thereof should be limited only by the proper scope of the claims appended hereto.

I claim:

1. In an abrasive peeling machine comprising a rotatable cylinder mounted for rotation about a horizontal axis and including an end ring, the peripheral wall of the cylinder comprising a plurality of parallel horizontally disposed peeling rolls, means for conveying material through the center of the cylinder for peeling action, and means for driving said rolls, the improvement which comprises a removable cartridge drive unit interposed between said driving means and each said peeling roll and having a detachable mounting in said ring, each said drive unit including a drive shaft having a drive connection at one end with the adjacent peeling roll.

2. In an abrasive peeling machine as recited in claim 1, in which each removable cartridge drive unit comprises an outerhousing detachably mounted in said ring, said drive shaft being journaled in said housing and projecting beyond either end thereof, a pair of bearings journaling said drive shaft in said housing, and respective seal rings at each end of said housing for retaining lubricant packed therein.

3. In an abrasive peeling machine as recited in claim 2, in which the other projecting shaft end carries a pinion for receiving a drive from said driving means.

4. In an abrasive peeling machine comprising a cylinder having a central shaft carrying a spiral feed screw thereon, and extending between a respective pair of annular end rings supported for rotation about said axis, an annular series of removable cartridge-type drive units detachably mounted in one of said rings and extending beyond said ring at either side thereof, means for driving said cartridge drive units at one end thereof, a drive coupling at the other end of each of said cartridge drive units, an annular series of peeling rolls each detachably coupled to one of said cartridge drive units, said peeling rolls having a detachable connection to the other ring at the opposite end to enable removal of a single peeling roll and the corresponding drive unit.

References Cited

UNITED STATES PATENTS

| | | | |
|---|---|---|---|
| 2,139,180 | 12/1938 | Urschel | 146—49 |
| 3,134,413 | 5/1964 | Dorsa et al. | 146—49 |
| 3,158,187 | 11/1964 | Smith et al. | 146—50 |

W. GRAYDON ABERCROMBIE, *Primary Examiner.*